Patented Nov. 1, 1932

1,885,592

UNITED STATES PATENT OFFICE

ALBERT COULTHARD AND ERNEST HARRY RODD, OF BLACKLEY, MANCHESTER, ENGLAND, ASSIGNORS TO IMPERIAL CHEMICAL INDUSTRIES LIMITED, OF LONDON, ENGLAND

PROCESS FOR THE MANUFACTURE OF NEW XANTHENE DYES

No Drawing. Original application filed June 29, 1929, Serial No. 374,942. Divided and this application filed June 29, 1929, Serial No. 374,943, and in Great Britain July 7, 1928.

In British Patent No. 314,825 there is described the manufacture of new dyes by condensing 3:7-tetra-alkyldiaminoxanthones with aromatic halogen compounds by means of sodium.

We have now found that the said xanthones can be condensed by means of a halogenated condensing agent such as phosphoryl chloride, phosphoryl bromide, phosphorus pentachloride, phosphorus trichloride or tribromide or carbonyl chloride, which is capable of replacing the ketonic oxygen of the xanthone by halogen, with aromatic compounds containing a reactive nuclear hydrogen atom to give dyes which have not hitherto been described. For example, using secondary or tertiary aromatic amines, which may be represented by the following formula

wherein $R_1$ represents a phenyl or naphthyl radical, $R_2$ represents a phenyl radical or an alkyl group and $R_3$ represents hydrogen or an alkyl group, and which contain a reactive nuclear hydrogen atom, xanthene dyes are obtained containing 3 substituted amino groups. These dyes which in the form of their hydrochloride salts may be represented by the probable formula

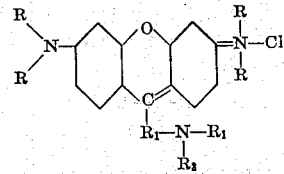

wherein R represents an alkyl group, one $R_1$ represents a phenyl or naphthyl radical while the other $R_1$ represents a phenyl radical or an alkyl group and $R_3$ represents hydrogen or an alkyl group, have advantageous dyeing properties. In our copending application Ser. No. 374,942 filed June 29, 1929, of which the present application is a division, we have set forth and claimed these new xanthene dyes and the process of making the same.

The present application is directed to a process of sulphonating these xanthene dyes described in our above-identified copending application and to the sulphonated dyes thus produced.

We have now discovered that such basic dyes can be sulphonated to give acid dyes having valuable properties. The most suitable basic dyes for treatment according to our invention are those formed by the condensation of amines which are known readily to yield sulphonated products when combined in other series, for instance, amines of the diphenylamine series. In particular the basic dyes obtained by condensing 3:7-tetramethyldiaminoxanthene with p-tolyl-m-phenetidine or para-tolyl-m-anisidine give when sulphonated acid dyestuffs dyeing wool and silk fine red shades. However we do not restrict ourselves to the use of any particular basic dyestuff of our new series and any one which will yield a soluble sulphonic acid derivative falls within the scope of our invention. These dyestuffs dye wool and silk in red shades which maintain their shade well in artificial light compared, for instance, with the dyeings obtained from acid rhodamines and when exposed to ultra violet light become appreciably bluer. One example illustrating a method of carrying out our invention is the following: The parts are by weight:

*Example.*—The basic dye which may be prepared by condensing together 3:7-tetramethyldiaminoxanthone and p-tolyl-m-phenetidine by means of phosphoryl chloride is well dried and finely powdered. This basic dye which in the form of the hydrochloride may be represented by the probable structural formula

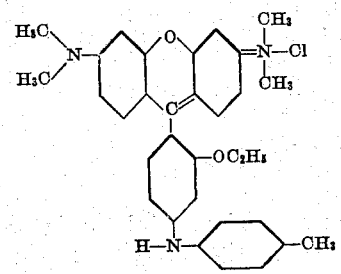

may be prepared as set forth in Example 2 of our copending application Ser. No. 374,942.

Of this dye 5 parts are stirred into 24 parts of 26 per cent oleum the temperature being maintained below 5° C. The mixture is stirred for about 6 hours or until sulphonation is complete which is the case when a test portion of the sulphonation mixture when diluted with water and made alkaline by means of ammonia does not give rise to a precipitate. The whole is then poured onto 150 parts ice and 30 parts salt, and neutralized by the addition of about 44 parts of caustic soda lye (40 per cent). The dye is precipitated usually as a flocculent solid. It is filtered off, pressed and dried at 100° C. It may be obtained as a greenish powder, readily soluble in water. Its solution is somewhat redder than that of the unsulphonated basic dye. It dyes wool and silk a bright red shade which retains its shade well by artificial light. On exposure to ultra violet light the dyeings become appreciably bluer.

What we claim and desire to secure by Letters Patent is:—

1. In the manufacture of new sulphonated acid dyes of the xanthene type, the process which comprises sulphonating basic dyes of the xanthene type having in the form of the unsulphonated hydrochloride the probable formula

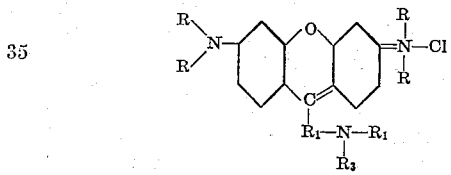

wherein R represents an alkyl group, one $R_1$ represents a phenyl or naphthyl radical while the other $R_1$ represents a phenyl radical or an alkyl group and $R_3$ represents hydrogen or an alkyl group; said unsulphonated basic dyes being obtainable by condensing a 3:7-tetra-alkyldiamino xanthone with an aromatic amine having the probable formula

wherein $R_1$ represents a phenyl radical, $R_2$ represents a phenyl or naphthyl radical or an alkyl group and $R_3$ represents hydrogen or an alkyl group, and which contain a reactive nuclear hydrogen atom, the said condensation being effected in the presence of a halogenated condensing agent capable of replacing the ketonic oxygen of the xanthone by halogen.

2. In the manufacture of new unsulphonated acid dyes of the xanthene type, the process which comprises sulphonating basis dyes of the xanthene type having in the form of the unsulphonated hydrochloride the probable formula

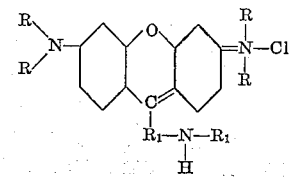

wherein R represents an alkyl group, $R_1$ represents a phenyl or naphthyl radical and $R_2$ represents a phenyl radical or an alkyl group; said unsulphonated basic dyes being obtainable by condensing 3:7-tetra-alkyldiaminoxanthones with aromatic amines having the probable formula

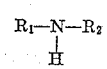

wherein $R_1$ represents a phenyl or naphthyl radical and $R_2$ represents a phenyl radical or an alkyl group and which contain a reactive nuclear hydrogen atom, the said condensation being effected in the presence of a halogenated condensing agent capable of replacing the ketonic oxygen of the xanthone by halogen.

3. In the manufacture of new sulphonated acid dyes of the xanthene type, the process which comprises sulphonating basic dyes of the xanthene type having in the form of the unsulphonated hydrochloride the probable formula

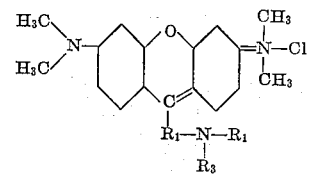

wherein one $R_1$ represents a phenyl or naphthyl radical while the other $R_1$ represents a phenyl radical or an alkyl group and $R_3$ represents hydrogen or an alkyl group; said unsulphonated basic dyes being obtainable by condensing 3:7-tetra-methyldiaminoxanthone with aromatic amines having the probable formula

wherein $R_1$ represents a phenyl or naphthyl radical, $R_2$ represents a phenyl radical or an alkyl group and $R_3$ represents hydrogen or an alkyl group, and which contain a reactive nuclear hydrogen atom, the said condensation being effected in the presence of a halogenated condensing agent capable of replacing the ketonic oxygen of the xanthone by halogen.

4. In the manufacture of new sulphonated acid dyes of the xanthene type, the process which comprises sulphonating basic dyes of the xanthene type having in the form of the unsulphonated hydrochloride the probable formula

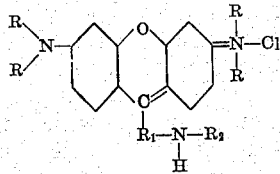

wherein R represents an alkyl group, $R_1$ and $R_2$ represent phenyl radicals; said unsulphonated basic dyes being obtainable by condensing 3:7-tetra-alkyldiaminoxanthones with aromatic amines having the probable formula

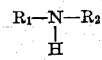

wherein $R_1$ and $R_2$ represent phenyl radicals and which contain a reactive nuclear hydrogen atom, the said condensation being effected in the presence of a halogenated condensing agent capable of replacing the ketonic oxygen of the xanthone by halogen.

5. The process of claim 1 in which the sulphonation is effected by means of oleum.

6. The process of claim 2 in which the sulphonation is effected by means of oleum.

7. The process of claim 4 in which the sulphonation is effected by means of oleum.

8. In the manufacture of new sulphonated acid dyes of the xanthene type, the process which comprises sulphonating basic dyes of the xanthene type having in the form of the unsulphonated hydrochloride the probable formula

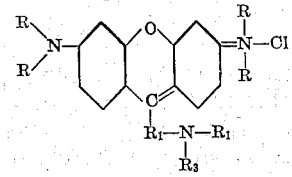

wherein R represents an alkyl group, one $R_1$ represents a phenyl or naphthyl radical while the other $R_1$ represents a phenyl radical or an alkyl group and $R_3$ represents hydrogen or an alkyl group; said unsulphonated basic dyes being obtainable by condensing 3:7-tetra-alkyldiaminoxanthones with aromatic amines having the probable formula

wherein $R_1$ represents a phenyl or naphthyl radical, $R_2$ represents a phenyl radical or an alkyl group and $R_3$ represents hydrogen or an alkyl group, and which contain a reactive nuclear hydrogen atom the said condensation being effected in the presence of phosphoryl chloride.

9. In the manufacture of new sulphonated acid dyes of the xanthene type, the process which comprises sulphonating a basic dye of the xanthene type having in the form of the unsulphonated hydrochloride the probable formula

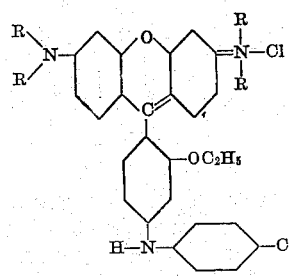

wherein R represents an alkyl group; said unsulphonated basic dye being obtainable by condensing a 3:7-tetra-alkyldiaminoxanthone with para-tolyl-meta-phenetidine, said condensation being effected in the presence of phosphoryl chloride.

10. In the manufacture of new sulphonated acid dyes of the xanthene type, the process which comprises sulphonating a basic dye of the xanthene type having in the form of the unsulphonated hydrochloride the probable formula

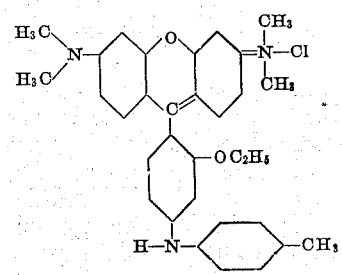

said unsulphonated basic dye being obtainable by condensing 3:7-tetra-methyldiaminoxanthone with para-tolyl-meta-phenetidine, said condensation being effected in the presence of phosphoryl chloride.

11. As new products, new sulphonated acid dyes of the xanthene type which may be obtained by sulphonating basic dyes of the xanthene type which have in the form of the unsulphonated hydrochloride the probable formula

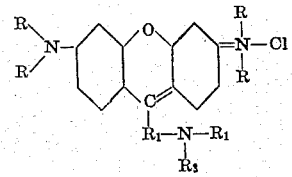

wherein R represents an alkyl group, one $R_1$ represents a phenyl or naphthyl radical while the other $R_1$ represents a phenyl radical or an alkyl group and $R_3$ represents hydrogen or an alkyl group, the said new sulphonated acid dyes dyeing wool in red shades which become appreciably bluer when exposed to ultra violet rays.

12. As new products, new sulphonated acid dyes of the xanthene type which may be obtained by sulphonating basic dyes of the xanthene type which have in the form of the unsulphonated hydrochloride the probable formula

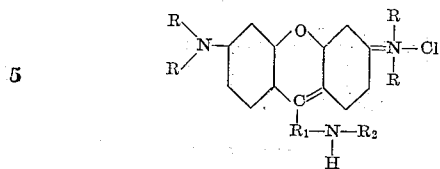

wherein R represents an alkyl group, $R_1$ represents a phenyl or naphthyl radical and $R_2$ represents a phenyl radical or an alkyl group, the said new sulphonated acid dyes dyeing wool in red shades which become appreciably bluer when exposed to ultra violet rays.

13. As new products, new sulphonated acid dyes of the xanthene type which may be obtained by sulphonating basic dyes of the xanthene type which have in the form of the unsulphonated hydrochloride the probable formula

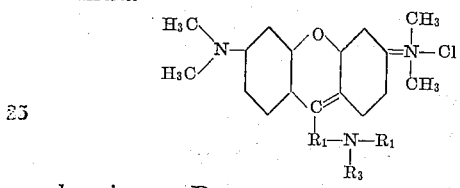

wherein one $R_1$ represents a phenyl or naphthyl radical while the other $R_1$ represents a phenyl radical or an alkyl group and $R_3$ represents hydrogen or an alkyl group, the said new sulphonated acid dyes dyeing wool in red shades which become appreciably bluer when exposed to ultra violet rays.

14. As new products, new sulphonated acid dyes of the xanthene type which may be obtained by sulphonating basic dyes of the xanthene type which have in the form of the unsulphonated hydrochloride the probable formula

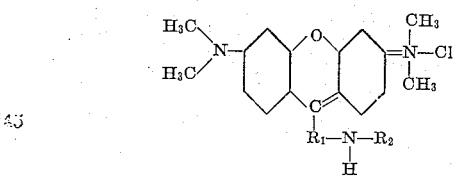

wherein $R_1$ represents a phenyl or naphthyl radical and $R_2$ represents a phenyl radical or an alkyl group, the said new sulphonated acid dyes dyeing wool in red shades which become appreciably bluer when exposed to ultra violet rays.

15. As new products, new sulphonated acid dyes of the xanthene type which may be obtained by sulphonating basic dyes of the xanthene type which have in the form of the unsulphonated hydrochloride the probable formula

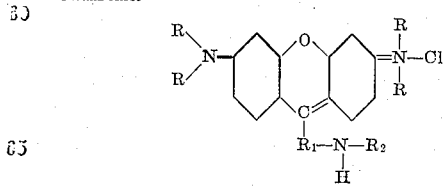

wherein R represents an alkyl group, $R_1$ and $R_2$ represent phenyl radicals, the said new sulphonated acid dyes dyeing wool in red shades which become appreciably bluer when exposed to ultra violet rays.

16. As new products, new sulphonated acid dyes of the xanthene type which may be obtained by sulphonating basic dyes of the xanthene type which have in the form of the unsulphonated hydrochloride the probable formula

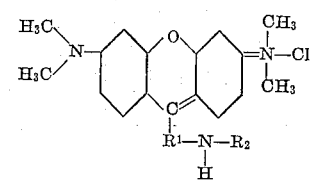

wherein $R_1$ and $R_2$ represent phenyl radicals, the said new sulphonated acid dyes dyeing wool in red shades which become appreciably bluer when exposed to ultra violet rays.

17. As new products, new sulphonated acid dyes of the xanthene type which may be obtained by sulphonating basic dyes of the xanthene type which have in the form of the unsulphonated hydrochloride the probable formula

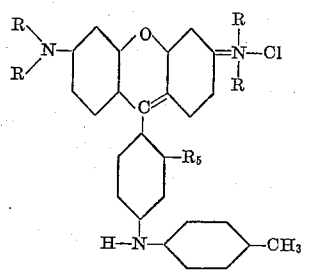

wherein R represents an alkyl group, $R_5$ represents an alkoxy group, the said new sulphonated acid dyes dyeing wool in bright red shades which become appreciably bluer when exposed to ultra violet rays.

18. As new products, new sulphonated acid dyes of the xanthene type which may be obtained by sulphonating basic dyes of the xanthene type which have in the form of the unsulphonated hydrochloride the probable formula

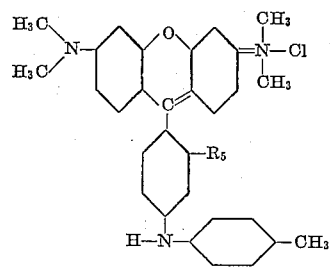

wherein $R_5$ represents an alkoxy group, the said new sulphonated acid dyes dyeing wool in bright red shades which become appreciably bluer when exposed to ultra violet rays.

19. As new products, new sulphonated acid dyes of the xanthene type which may be obtained by sulphonating basic dyes of the xanthene type having in the form of the unsulphonated hydrochloride the probable formula

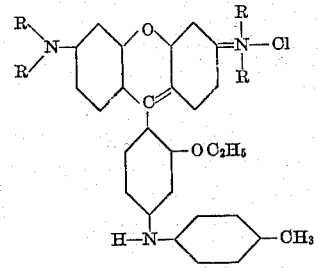

wherein R represents an alkyl group, said new sulphonated acid dyes dyeing wool in bright red shades which become appreciably bluer when exposed to ultra violet rays.

20. As new products, new sulphonated acid dyes of the xanthene type, which may be obtained by sulphonating basic dyes of the xanthene type which have in the form of the unsulphonated hydrochloride the probable formula

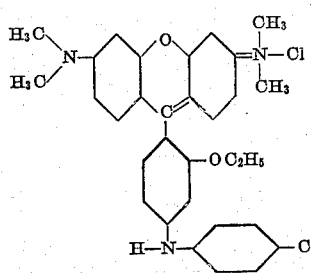

said new sulphonated acid dyes dyeing wool in bright red shades which become appreciably bluer when exposed to ultra violet rays.

21. In the manufacture of new sulphonated acid dyes of the xanthene type, the process which comprises sulphonating a basic dye of the xanthene type having in the form of the unsulphonated hydrochloride the probable formula

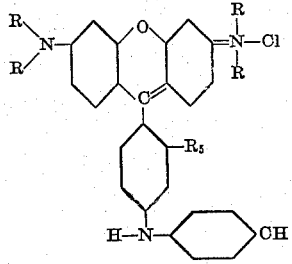

wherein R represents an alkyl group and $R_5$ represents an alkoxy group; said unsulphonated basic dye being obtainable by condensing a 3:7-tetra-alkyldiaminoxanthone with an aromatic amine having the probable formula

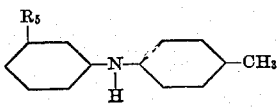

the said condensation being effected in the presence of phosphoryl chloride.

22. In the manufacture of new sulphonated acid dyes of the xanthene type, the process which comprises sulphonating a basic dye of the xanthene type having in the form of the unsulphonated hydrochloride the probable formula

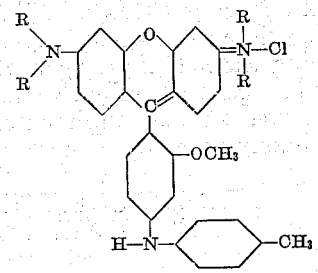

wherein R represents an alkyl group; said unsulphonated basic dye being obtaintable by condensing a 3:7-tetra-alkyldiaminoxanthone with para-tolyl-meta-anisidine, the said condensation being effected in the presence of phosphoryl chloride.

23. As new products, new sulphonated acid dyes of the xanthene type which may be obtained by sulphonating basic dyes of the xanthene type which have in the form of the unsulphonated hydrochloride the probable formula

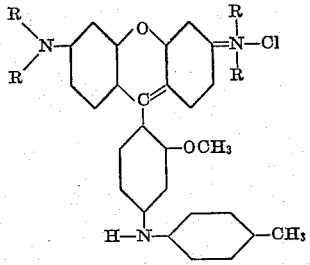

wherein R represents an alkyl group, said new sulphonated acid dyes dyeing wool in bright red shades which become appreciably bluer when exposed to ultra violet rays.

24. As new products, new sulphonated acid dyes of the xanthene type which may be obtained by sulphonating basic dyes of the xanthene type which have in the form of the unsulphonated hydrochloride the probable formula

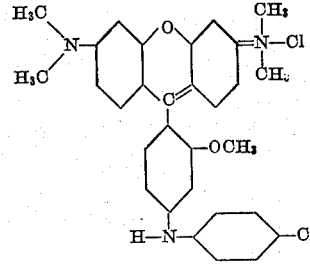

said new unsulphonated acid dyes dyeing wool in bright red shades which become appreciably bluer when exposed to ultra violet rays.

25. In the manufacture of new sulphonated acid dyes of the xanthene type, the process which comprises reacting with 26 per cent oleum or its equivalent, the condensation product of a 3:7-tetra-alkyldiaminoxanthone with an amine selected from a class consisting of secondary and tertiary amines having a reactive nuclear hydrogen atom, the said condensation being effected in the presence of a halogenated condensing agent capable of replacing the ketonic oxygen of the xanthone by halogen; whereby the said condensation product becomes sulphonated.

In testimony whereof we affix our signatures.

ALBERT COULTHARD.
ERNEST HARRY RODD.

Certificate of Correction

Patent No. 1,885,592. November 1, 1932.

ALBERT COULTHARD ET AL.

It is hereby certified that error appears in the printed specification of the above-numbered patent requiring correction as follows: In the title and throughout the specification for "xanthene" read *xanthen*; page 2, line 53, claim 1, after "phenyl" insert the words *or naphthyl*; and line 54, strike out the words "or naphthyl"; line 62, claim 2, for "unsulphonated" read *sulphonated*; line 64, for "basis" read *basic*; and lines 68 to 74, strike out the formula and insert instead:

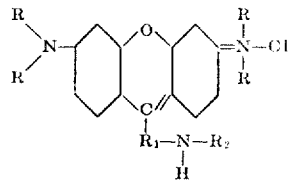

page 5, line 55, claim 21, for the last two letters of the formula "CH" read $CH_3$; and line 127, claim 24, for "unsulphonated" read *sulphonated*; and that the said Letters Patent should be read with these corrections therein that the same may conform to the record of the case in the Patent Office.

Signed and sealed this 6th day of December, A. D. 1932.

[SEAL.]

M. J. MOORE,
*Acting Commissioner of Patents.*